(12) United States Patent  (10) Patent No.: US 8,069,228 B2
Bramley et al.  (45) Date of Patent: Nov. 29, 2011

(54) PREVENTING ACCESS OF A NETWORK FACILITY IN RESPONSE TO AN OPERATION

(75) Inventors: Richard Bramley, Mansfield, MA (US); Jayant Mangalampalli, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 12/542,553

(22) Filed: Aug. 17, 2009

(65) Prior Publication Data

US 2010/0287290 A1    Nov. 11, 2010

Related U.S. Application Data

(60) Provisional application No. 61/215,733, filed on May 8, 2009.

(51) Int. Cl.
  *G06F 15/177* (2006.01)
  *G06F 15/173* (2006.01)
(52) U.S. Cl. .......................... 709/220; 709/226; 709/229
(58) Field of Classification Search .................. 709/220, 709/226, 229
  See application file for complete search history.

(56) References Cited

U.S. PATENT DOCUMENTS

| | | | |
|---|---|---|---|
| 6,338,112 B1 * | 1/2002 | Wipfel et al. | 710/269 |
| 6,529,910 B1 * | 3/2003 | Fleskes | 707/770 |
| 6,785,721 B1 * | 8/2004 | Immerman et al. | 709/220 |
| 6,785,728 B1 * | 8/2004 | Schneider et al. | 709/229 |
| 7,051,031 B2 * | 5/2006 | Schein | 707/697 |
| 7,159,060 B2 | 1/2007 | Martin et al. | |
| 7,234,015 B1 | 6/2007 | Cho et al. | |
| 7,356,636 B2 | 4/2008 | Torudbakken et al. | |
| 7,447,822 B2 | 11/2008 | Wu | |
| 7,447,934 B2 | 11/2008 | Dasari et al. | |
| 7,506,087 B2 | 3/2009 | Ho et al. | |
| 7,519,761 B2 | 4/2009 | Gregg | |
| 7,689,748 B2 * | 3/2010 | Grossman et al. | 710/261 |
| 7,808,995 B2 * | 10/2010 | Kuo et al. | 370/392 |
| 2005/0182940 A1 | 8/2005 | Grawrock et al. | |
| 2006/0112342 A1 | 5/2006 | Bantz et al. | |
| 2008/0320594 A1 | 12/2008 | Jiang | |

FOREIGN PATENT DOCUMENTS

JP    2006040115    2/2006

OTHER PUBLICATIONS

International Searching Authority, International Search Report and Written Opinion, Appln No. PCT/US2010/046886, date of mailing Apr. 29, 2011, p. 9.

* cited by examiner

*Primary Examiner* — Hussein A. Elchanti

(57) ABSTRACT

Methods, systems, apparatuses and program products are disclosed for context sensitive selective control of usage of connection(s) to telecommunications networks, especially Internet and the like.

Provision is made for allowing certain resource(s) to exploit Internet while disallowing other resource(s) from doing the same, and making the implementation hardened against attack or compromise. An exemplary implementation is to allow anti-malware products to update over Internet while preventing malware from interfering or using the same communications resource simultaneously. Previously developed implementations have shortcoming that are overcome by the present invention.

24 Claims, 6 Drawing Sheets

Map for PCIe Bridge base address B0:D1C:F1 ADR,0x001C0001

Offset (0x12)     // LSTS -Link: Status Register
value LASK     // Link Active Status Offset (0x1A)     // LSTS -Slot Status Register
value LSABPR     // Attention Button Pressed
value PDCX     // Presence Detect Changed
value PDSX     // Presence Detect State Offset (0x1B)
value LSCX     // Link Active State Changed Offset (0x20)     // RSTS -Root Status Register
value PSPX     // PME Status Offset(0x98)     // MPC -Miscellaneous Port Config Reg
value HPEX     // Hot Plug SCI Enable
value PMEX     // Power Management SCI Enable Offset (0x9C)     // SMSCS -SHI/SCI Status Register
value HPSX     // Hot Plug SCI Status
value PMSK     // Power Management SCI Status

Exemplary Device behind PCIe Bridge

FIG.2

Offset 0x52 – 0x53
Bit [15 DOWNTO 14] - Reserved
Bit [13]           -   DLLA – Data Link Layer Active
                       1b = Data Link control and Management State
                              Machine are in DL Active State
                       0b = Data Link control and Management State
                              Machine are NOT in DL Active State
Bit [12 DOWNTO 0] - Reserved

Exemplary LSTS-Link Status Register

FIG.3A

Offset 0x5A – 0x5B

Bit [15 DOWNTO 9] - Reserved

Bit [8] - LASC - Link Active State Changed
1 = the value reported in
the Data Link Layer Link Active field of
the Link Status register is changed.

Bit [7] - Reserved

Bit [6] - PDS – Presence Detect State
1 = Slot has a device connected to it.
0 = Slot has no device connected to it.

Bit [5 DOWNTO 4] - Reserved

Bit [3] - PDC – Presence Detect Changed
1 = PDS bit has changed
0 = PDS bit has not changed Bit [2 DOWNTO 1] - Reserved Bit [0] - ABP – Attention Button Pressed
1 = Attention Button has been pressed
0 = Attention Button has not been pressed

Exemplary SLSTS-Slot Status Register

FIG.3B

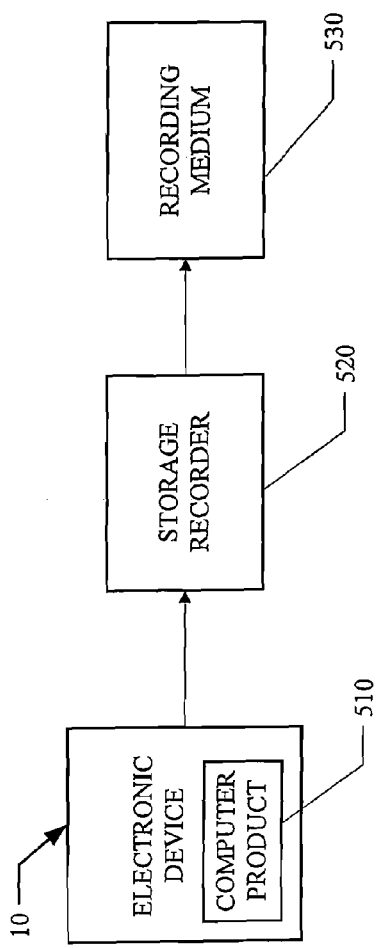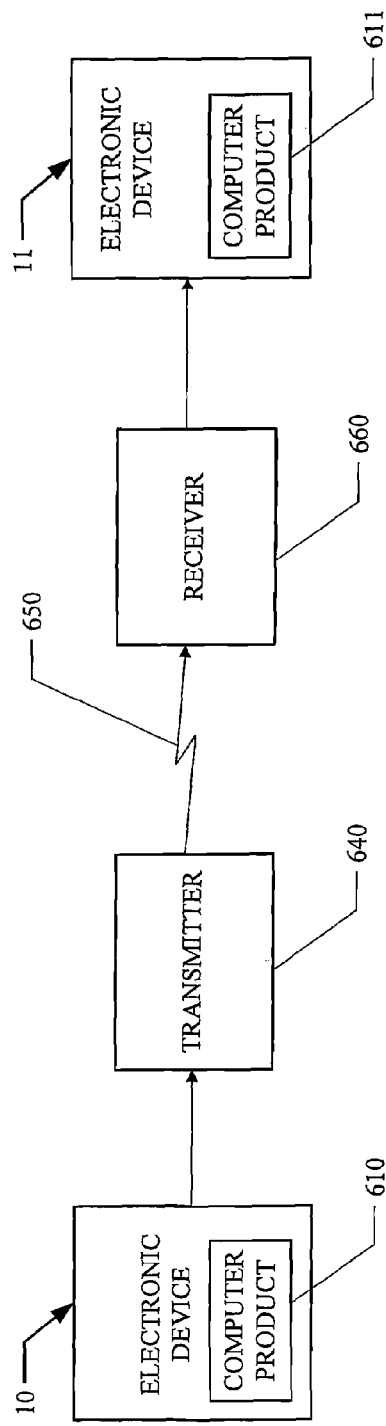

PREVENTING ACCESS OF A NETWORK FACILITY IN RESPONSE TO AN OPERATION

CROSS-REFERENCE TO RELATED APPLICATION

This application claims priority to United States patent provisional application Ser. No. 61/215,733, entitled VIRTUAL HOTPLUG TECHNIQUES, filed on May 8, 2009.

FIELD OF THE INVENTION

The present invention generally relates to personal computers and devices sharing similar architectures and, more particularly relates to a system and corresponding method for controlling usage of connection(s) to telecommunications networks, especially networks that deploy Internet Protocols and the like especially, but not essentially, within hypervisor and OS(s) (operating system(s)) context(s).

BACKGROUND OF THE INVENTION

Modernly, malware on PCs (Personal Computers) is increasingly convoluted and harmful. Anti-malware products have sprung up to combat the problem. In response, malware has begun to develop features that target the anti-malware products themselves so as to damage their effectiveness. In response, techniques have been developed to harden anti-malware products against attack.

One particular problem is that anti-malware products commonly have a need to access updated information (for example data tables of virus signatures) and an efficient way of doing this is via Internet-based downloading. A need has existed to provide for such downloading and similar activities to occur without risk of the downloading process itself becoming compromised by a malware attack. There is a need to robustly control (particularly to alternately grant and disallow) access to communications, especially to and from Internet. In particular it is desirable to be able to deny access to the Internet to ordinary OSes (Operating Systems) and to any programs that they load pending completion of the downloading (and perhaps of integrity verification) of anti-malware information such as virus signatures.

Previously developed solutions address these issues only in part and there remains significant room for improvement.

SUMMARY OF THE INVENTION

The disclosed invention includes, among other things, methods and techniques for controlling usage of communications facilities by program products such as, on the one hand, anti-malware products and on the other hand ordinary OSes (operating systems), applications programs and systems programs including malware programs.

The present invention provides a method for operating a computer for communications control and also an apparatus that embodies the method. In addition program products and other means for exploiting the invention are presented.

According to an aspect of the present invention a method for controlling communications is disclosed. In an embodiment of the invention the method may include detecting an operable network facility such as a network device or service. Next, an OS or in another VM (Virtual Machine) access to the network facility may be denied, disallowed or prevented for a period of time until/unless a particular event may occur. During times that access is denied, a collage or aggregation of anti-malware information may be downloaded or otherwise formed and/or validated, certified etc. Typically later, and perhaps after the integrity of the entirety of the anti-malware information has been assured, a previously denied program context may be granted access to communications, often including to the Internet.

Various techniques for granting and denying (etc.) communications access are disclosed, especially including utilization of features such as VMM (Virtual Machine Monitors, including hypervisor(s)) and hot plugging techniques such as those related to PCIe (Peripheral Component Interconnect Express) bridge(s).

According to further aspects of the present invention, embodiments of the invention may provide for program products and electronic devices that employ the methods described above, and/or similar methods.

A further advantage and/or feature provided by or resulting from implementing the present invention is that it can provide anti-malware software products with mechanisms for further hardening against malware (and/or other) attack.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 2 is a Sample ASL (ACPI Source Language) entry according to usage in an embodiment of the invention;

FIG. 3A and FIG. 3B show typical Registers used in an example bus controller chip that implements PCIe bridge functions.

FIG. 5 shows how an exemplary embodiment of the invention may be encoded onto a computer medium or media; and FIG. 6 shows how an exemplary embodiment of the invention may be encoded, transmitted, received and decoded using electromagnetic waves.

DETAILED DESCRIPTION OF THE INVENTION

Figure 1:
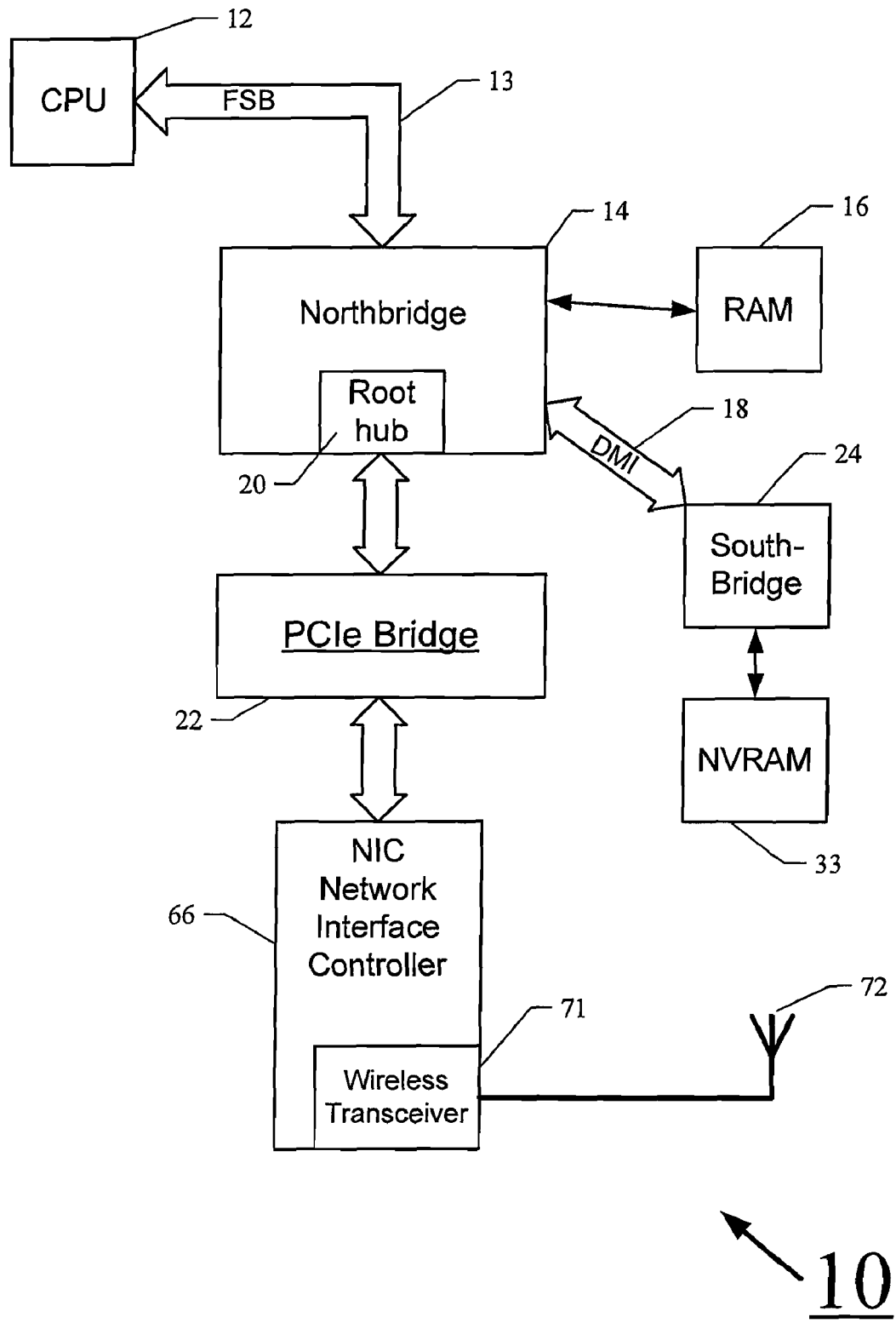
FIG. 1 is a schematic block diagram of an electronic device configured to implement security functionality according to embodiments of the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

FIG. 1 is a schematic block diagram of an electronic device configured to implement the security functionality according to the present invention.

In an exemplary embodiment, the electronic device 10 may be implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, netbook, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace. The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

The bus controller 14 may also be coupled to a system bus 18, for example a DMI (Direct Media Interface) in typical Intel® style embodiments. Coupled to the DMI 18 may be a so-called Southbridge controller chip 24. Also, typically, Southbridge chip 24 may also be coupled to a NVRAM (non-volatile random-access memory) 33.

In an embodiment, the bus controller 14 may incorporate a PCIe (Peripheral Component Interconnect Express) root hub 20. PCIe root hub 20 in turn may connect to a PCIe Bridge 22. PCIe bridge may be incorporated into bus controller 14 or it may be discrete therefrom.

PCIe Bridge 22 typically connects to one or more PCIe peripherals. In an embodiment of the invention PCIe Bridge 22 connects to a NIC (Network Interface Controller) 66 which may be a wireless NIC which drives a Wireless Transceiver 71. Wireless Transceiver 71 may operate in compliance with IEEE 802.11 or other suitable standards. Wireless Transceiver 71 will typically include an RF (Radio Frequency) circuit coupled to some form of radiating antenna 72.

In accordance with embodiments of the invention, a feature that may be desired in a general purpose computing environment that is vulnerable to attempted malware attacks could be to control closely the communications facility. The communications facility may be embodied, in part, by the NIC (FIG. 1, Ref. 66) or alternatively embodied as a software service or a system service (not shown in the figures) that utilizes communications equipment such as a NIC or other equipment. In particular, it may be desired to grant to anti-malware software applications access to the communications facility while in effective denying that same access (or perhaps any communications access) to OS (Operating System) and applications loaded and run under the control of the OS.

One previously developed solution provides for such a capability for wired Internet communications connects (and broad equivalents) and has been based on manipulating a PCI (Peripheral Component Interconnect) configuration space and correlated MMIO/PIO (Memory-mapped Input/Output and Programmed Input/Output) regions of wired NIC devices. One such implementation is hypervisor based and DomU (Domain Unprivileged) located programs are informed that (virtual) network devices are unavailable. (The meaning and usage of DomU and the related term Dom0 (Domain Privileged) are well known in the hypervisor arts).

In an exemplary embodiment of the invention it may be desired that in a hypervisor environment DomU hosts a main OS (and application programs subordinate thereto). Simultaneously, Dom0 must be allowed to have Internet connection (s) while a virus-pattern file (or other anti-malware information) is being downloaded into the Dom0 VM (Virtual machine) and stored securely in memory. Such an anti-virus pattern file may typically be subsequently communicated to DomU and applied using a part of an anti-malware application program designed to run in a DomU context. An example could be one of the well-known anti-virus applications such as is provided by Trend Micro Incorporated. Previously developed hypervisor based implementations exist for certain types of wired network connections but embodiments of the present invention are of more general applicability.

Attempts to apply similar configurations to wireless communications devices posed significant challenges. In contrast with wired NIC configurations, there is no small group of registers in typical wireless device(s) that could be virtualized so as to convey a surrogate device status to drivers in DomU that a communications device is not available to the respective VM. Moreover, for mostly commercial reasons, sufficient documentation on the wireless device may not be easily available to implementers of generalized solutions.

Usage, for the present purpose, of RF_KILL switch (well known in the art) emulation was not considered to be a reasonable (possibly not even possible) approach since a typical EC (Embedded Controller chip) that controls an RF_KILL switch (or substantial equivalent) may directly drive the RF_OFF pin on the PCIe socket. Modern wireless controllers are commonly and usefully connected by a PCIe.

The typical EC command set was not considered to be a good target for implementation either; as there is insufficient standardization and/or open specifications; also there are too many variants to be a good choice for promiscuous adaptation. Also, all interface enablement features available for use by external physical controls (for example Fn-buttons or a wireless switch) were regarded as unsuitable to the present purpose for reason that they are also available to malware that operates in a DomU. Available in a DomU implies available to programs that run as Windows® application programs—and much malware runs that way.

The vulnerabilities described above pose particular risk immediately after suspend/resume cycles and hibernate/resume cycles wherein wireless devices typically have previously been initialized and used, such as by DomU resident device drivers. Drivers maintain internal states of the devices at the time of suspend and hibernate and may fail to work reliably if the state of device at the time of resume is unexpected (i.e. anything but the same as the stored state).

Embodiments of the invention may use PCIe hot-plug and hot-unplug device status services. The use of hot-plug in connection with PCIe is well-known in the art. One approach, within the general scope of the invention, is to substitute or surrogate wireless NIC device status seen by DomU (i.e. a hypervisor-generated virtual wireless NIC device status). The virtual wireless NIC device status may initially be that which would apply if the device had not yet been plugged in (i.e. as reporting "no device present" in the corresponding virtualized PCIe slot).

This condition (no device plugged in) may be sustained at least until after virus pattern download (or other anti-malware activity or the like) is completed. However the invention is not limited to a strictly anti-malware context and may find broader application. Thus, the wireless device may appear to DomU by becoming hot-plugged for an initial first time only when DomU seeks to get Internet connection and such connection has become allowed. Of course, in this context, the hot-plug addition by DomU is merely virtual and does not reflect an actual addition or activation of wireless hardware.

Hot plug and hot unplug is implemented where real PCIe bridges are used and conform to formally approved industry standardized specifications. This permits an implementation to be created with confidence that it will be robust and durable.

Dom0 or Domain Zero is a term used in the hypervisor arts to refer to the "privileged domain", which is typically embodied as a VM (Virtual Machine) that has greater privilege than all other domains or VMs (known as DomU for "unprivileged domain"). Within Dom0 lies a hypervisor-capable OS (operating system) kernel such as a Linux® kernel program, upon which the applications programs for running on that kernel may be found.

FIG. 2 is a Sample ASL (ACPI (Advanced Configuration and Power Interface) Source Language) entry according to usage in an embodiment of the invention. The use of ASL is well known in the BIOS (Basic Input Output System) arts. FIG. 3A and FIG. 3B show typical Registers used in an example bus controller chip that implements PCIe bridge functions.

Taken together FIGS. 2, 3A and 3B provide exemplary encodings for use with commonly found integrated circuits (chips) used as bus controllers in computers. The Intel® SCH (System Controller Hub) is a typical example but the invention is not limited to that device.

Figure 4:
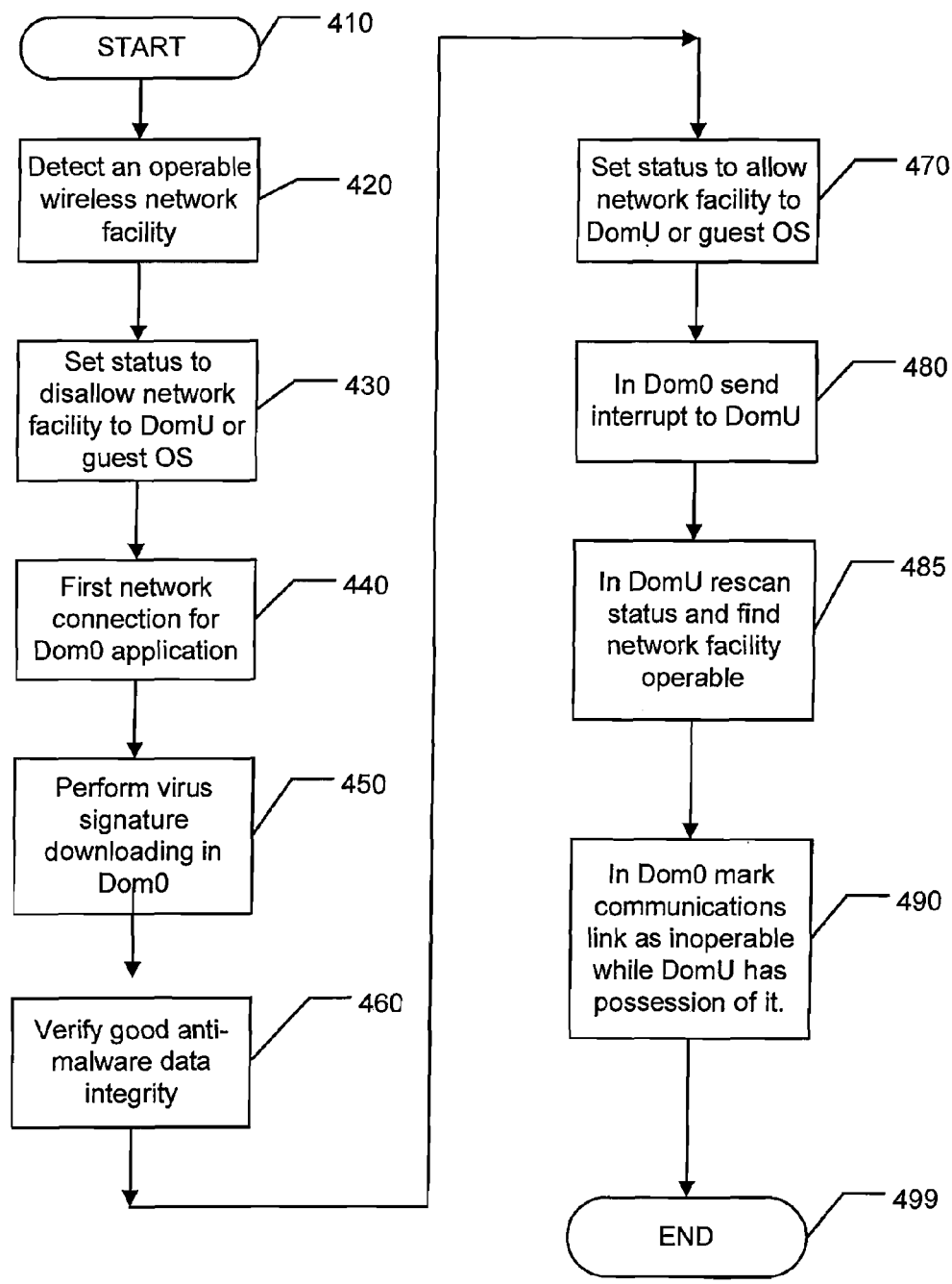
FIG. 4 is a flowchart illustrating the steps performed in implementing an embodiment of the present invention.

FIG. 4 is a flowchart illustrating the steps performed in implementing an one embodiment of the present invention and conforming, in large part, to the description of the virtualized PCIe Hot plug and unplug techniques given above.

An overview of the processes involved that places the method in a readily understood context follows; followed by a stepwise description that focuses more on the inventive aspects of the method of an exemplary embodiment of the invention. It will be understood by persons of ordinary skill in the art that many of the programs used to implement embodiments of the invention will need to be implemented, in part, as part of the computer BIOS and in further part may also need to be incorporated in hypervisor code.

An early step as the system comes up from start (bootload) or resume (from low power sleeping states) is to make the device appear to be unplugged from the viewpoint of any/all programs resident in DomU. This may involve PCIe Bridge initialization of a real or virtual bridge with Hot-Plugging capabilities.

The wireless NIC used in the example being described is either connected via a real PCIe bridge or the hypervisor virtualizes the wireless controller as though it were located behind a (virtual) PCIe bridge. The internal (virtualizable) state of the Bridge is maintained by QEMU and is initialized to an "UNPLUG—NOT_DETECTED", value which implies that the device "unplug" may not yet have been detected by any program in a DomU context. QEMU is an open source processor emulator well known in the hypervisor arts; it does not appear to be an abbreviation or mnemonic.

Next, the PCIe's virtual (QEMU aware) Slot Status Register (PCIe configuration space) is updated to reflect this by showing the PDS (Presence Detect State) as clear. Before long a program in a DomU context will read this and become convinced that no virtual wireless NIC device is presently attached (plugged in).

Also in hypervisor QEMU support and/or BIOS, a virtual PDC (Presence Detect Changed) bit in the virtual Slot Status Register is set to indicate device presence has changed and an IRQ (Interrupt Request) is issued to cause DomU to initiate a re-scan of bridge status. Causing a rescan (typically from within an ISR—interrupt service routine) is particularly robust in a context of recovery from hibernation. At this point the internal bridge state maintained by QEMU may then updated to "UNPLUG—DETECTED" status or similar or equivalent.

Other hardware controller implementations may use other mechanisms for notifying status changes, for example with some PCIe controller chips is defined a DLLA (Data Link Layer Active) field within a LSTS (Link Status Register) and an associated LSCX (Link Active State changed) with associated events. Refer to FIGS. 2 and 3A for information on one exemplary placing of DLLA and LSCX.

Next, LASC (Link Active State Change) bit virtual Slot Status Register is presented to DomU as set so that DomU will check for link active prior to initiating any possible configuration cycles to the hot plugged device. This completes the virtual unplug process.

DomU optionally writes the IRQ value in PCI's IRQ register (0x3c), which completes the unplug cycle. QEMU's internal state is changed to UNPLUG DONE.

When an external criterion is fulfilled (such as completion of a particular stage of an anti-malware program) a QEMU Hot-Plug process takes place. To QEMU this just looks like a change of status, but to an OS in DomU it looks like a hot plug status event, and to hypervisor the total action amounts to generating and fielding a virtual (or virtualized) hot plug event. PDS is used (as before in unplugging) to initiate a bridge rescan. At that point DomU "sees" that PDS status changed, so it will rescan the bridge to see which buses on the bridge has any device that is recently (apparently, virtually) connected. Since the Configuration space already has details about the subordinate bus of wireless on the bridge (which DomU has not read until this present context), DomU starts fully scanning the new bus whereupon it will detect the virtual wireless NIC as being operable.

One example will now be described in more specific terms, but many variants in implementation are possible within the general scope of the invention. In step 410, in the exemplary method, entry is made into a method that is part of the exemplary embodiment of the invention. In particular, the wireless facility may be a device driver interface to a particular type of hardware wireless network controller, or it may be a more general network software interface such as the well-known NDIS (Network Driver Interface Service)

At step 420, hypervisor (for example in a modified variant of QEMU) detects an operable wireless network facility At step 430, hypervisor set status to disallow network facility to DomU (or a similarly situated guest OS). At step 440, a first network connection is made for use by a Dom0 application. At step 450, the Dom0 application performs virus signature downloading entirely within the Dom0 context. Other processes may proceed in DomU and/or the guest OS but since the NIC is not visible these cannot conflict with, nor compromise the Dom0 application.

At step 460, the Dom0 application verifies a good anti-malware data integrity. At step 470, hypervisor sets QEMU based status thus allowing network facilities to DomU or guest OS.

At step 480, In Dom0 send IRQ or other interrupt to DomU. And in response thereto, at step 485 DomU rescans status and finds network facility (virtual NIC hardware or software service) to be operable.

Next, at step 490, In Dom0 marks the communications link as inoperable to Dom0 applications while DomU has possession of it. In a hypervisor context ownership of a communications link may of course be shared or may be passed to and fro according to the applications in use. But in at least some implementations it will be denied to Dom0 for at least part of the time.

And at step 499 the method ends.

With regards to FIG. 5, computer instructions to be incorporated into in an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

FIG. 6 shows how an exemplary embodiment of the invention may be encoded, transmitted, received and decoded using electromagnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electromagnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10. In this way one manufactured product (a particularly encoded modulated electromagnetic carrier wave) may be used to form a derivative manufacture, for example, a ROM (Read-Only Memory) resident BIOS (Basic Input-Output System) according to an embodiment of the invention.

Other topologies devices could also be used to construct alternative embodiments of the invention.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of operating a computer comprising:
performing an operation in a privileged domain, wherein the operation in the privileged domain utilizes a network facility selected from a network device or a network service;
in response to detecting the operation being performed in the privileged domain that utilizes the network facility, setting a first state in the computer to prevent instructions executing in a context provided by a virtual machine or an operating system from accessing the network facility; and
in response to detecting completion of the operation in the privileged domain, setting a second state in the computer to allow the instructions executing in the context to access the network facility.

2. The method of claim 1 wherein:
the context is provided by a DomU (domain unprivileged) virtual machine; and
the privileged domain is a Dom0 (domain zero) virtual machine.

3. The method of claim 1 further comprising:
while the computer is in the second state to allow access of the network facility by the instructions executing in the context, executing instructions to deny usage of the network facility to instructions executing within the privileged domain.

4. The method of claim 1 wherein:
the operation comprises acquisition of anti-malware information over a network for an anti-malware program.

5. The method of claim 1 wherein:
the network facility includes a NIC (network interface controller) or an NDIS (Network Driver Interface Service) compliant service routine.

6. The method of claim 1 wherein:
the network facility includes a wireless network controller.

7. The method of claim 1 wherein:
setting the first state comprises setting one of a PDC (presence detect change) state, a PDS (presence detect state), or a LASC (link active state change) state.

8. The method of claim 1 further comprising:
triggering a virtualized hot plug event corresponding to setting the second state.

9. The method of claim 8 further comprising:
executing an ISR (interrupt service routine) responsive to the virtualized hot plug event to allow the instructions executing in the context to detect the network facility.

10. The method of claim 1 further comprising:
virtualizing at least a part of the network facility to produce a virtual device or a virtual network service, and
utilizing the virtual device or the virtual network service by executing instructions in the context.

11. The method of claim 1, wherein the network device is a network interface controller, and wherein setting the first state causes the network interface controller to not be visible to the instructions executing in the context.

12. The method of claim 11, wherein the context comprises a domain of the virtual machine.

13. The method of claim 1, wherein the network device is a network interface controller, and wherein setting the first state causes the network interface controller to appear disconnected to the instructions executing in the context.

14. A computer program product comprising:
at least one non-transitory computer-readable medium having instructions encoded therein, the instructions when executed by at least one processor cause said at least one processor to:
execute within a first context selected from a group consisting of a first VM (virtual machine) and a VMM (Virtual Machine Monitor), first instructions that utilize a network facility selected from a group consisting of a network device and a network service;
in response to detecting the first instructions executing within the first context and persisting to utilize the network facility, execute second instructions within the first context to prevent usage of the network facility requested by third instructions executing within a second context selected from a group consisting of a second VM and an operating system; and
responsive to a detection of completion of the first instructions within the first context, executing further instructions within the first context to make a grant of usage of the network facility to the third instructions executing within the second context.

15. The computer program product of claim 14 wherein the first instructions are executed within the first VM to download anti-malware information for an anti-malware program.

16. A computer program product comprising at least one non-transitory computer-readable medium having instructions encoded therein, the instructions when executed by at least one processor cause a computer to:
perform an operation in a first domain selected from among a privileged domain virtual machine or a virtual machine monitor, wherein the operation in the first domain utilizes a network facility selected from a network device or a network service;
in response to detecting the operation being performed in the first domain that utilizes the network facility, setting a first state in the computer to prevent instructions executing in a second domain selected from among an unprivileged virtual machine or an operating system from accessing the network facility; and in response to detecting completion of the operation in the first domain, setting a second state in the computer to allow the instructions executing in the second domain to access the network facility.

17. The computer program product of claim 16, wherein the network device is a network interface controller, and wherein setting the first state causes the network interface controller to not be visible to the instructions executing in the second domain.

18. The computer program product of claim 17, wherein the second domain comprises the unprivileged virtual machine.

19. The computer program product of claim 16, wherein the instructions in the computer-readable medium when executed cause the computer to further:
   trigger a virtualized hot plug event corresponding to setting the second state; and
   execute an ISR (interrupt service routine) responsive to the virtualized hot plug event to allow the instructions executing in the second domain to detect the network facility.

20. An electronic device comprising:
   a privileged domain to execute instructions performing an operation in a privileged domain, wherein the operation in the privileged domain utilizes a network facility selected from a network device or a network service;
   a virtual machine; and
   at least one processor to:
   in response to detecting the operation being performed in the privileged domain that utilizes the network facility, set a first state in the electronic device to prevent instructions executing in the virtual machine from accessing the network facility; and
   in response to detecting completion of the operation in the privileged domain, setting a second state in the computer to allow the instructions executing in the virtual machine to access the network facility.

21. The electronic device of claim 20, wherein the network device is a network interface controller, and wherein setting the first state causes the network interface controller to not be visible to the instructions executing in the virtual machine.

22. The electronic device of claim 20, wherein the network device is a network interface controller, and wherein setting the first state causes the network interface controller to appear disconnected to the instructions executing in the virtual machine.

23. The electronic device of claim 20, wherein the at least one processor is to further:
   trigger a virtualized hot plug event corresponding to setting the second state.

24. The electronic device of claim 23, wherein the at least one processor is to further:
   execute an ISR (interrupt service routine) responsive to the virtualized hot plug event to allow the instructions executing in the virtual machine to detect the network facility.

* * * * *